(12) United States Patent
Honda et al.

(10) Patent No.: US 7,605,745 B2
(45) Date of Patent: Oct. 20, 2009

(54) ON-VEHICLE RADAR DEVICE AND ON-VEHICLE RADAR DEVICE CONTROL SYSTEM

(75) Inventors: Kanako Honda, Kobe (JP); Osamu Isaji, Kobe (JP); Kazuo Shirakawa, Kawasaki (JP); Naofumi Ohkubo, Kawasaki (JP); Tetsuo Seki, Kawasaki (JP)

(73) Assignees: Fujitsu Ten Limited, Kobe-shi (JP); Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 11/694,377

(22) Filed: Mar. 30, 2007

(65) Prior Publication Data

US 2008/0106458 A1    May 8, 2008

(30) Foreign Application Priority Data

Mar. 30, 2006    (JP) .............................. 2006-092964

(51) Int. Cl.
*G01S 13/00* (2006.01)

(52) U.S. Cl. .............................. 342/70; 342/82; 342/83; 342/159

(58) Field of Classification Search .................. 342/60, 342/70–72, 82–88, 159, 200–203; 455/450, 455/464, 509, 512, 166.2
See application file for complete search history.

(56) References Cited

U.S. PATENT DOCUMENTS

| | | | | |
|---|---|---|---|---|
| 4,088,955 A | * | 5/1978 | Baghdady | 455/283 |
| 5,381,153 A | * | 1/1995 | Saito et al. | 342/70 |
| 5,497,162 A | * | 3/1996 | Kaiser | 342/159 |
| 5,757,308 A | * | 5/1998 | Lissel et al. | 342/70 |
| 5,926,127 A | | 7/1999 | Schmidt et al. | |
| 5,973,636 A | * | 10/1999 | Okubo et al. | 342/70 |
| 6,087,928 A | * | 7/2000 | Kleinberg et al. | 340/436 |
| 6,888,491 B2 | * | 5/2005 | Richter | 342/70 |
| 6,894,641 B2 | * | 5/2005 | Uehara et al. | 342/173 |

(Continued)

FOREIGN PATENT DOCUMENTS

DE    19538309    4/1997

(Continued)

OTHER PUBLICATIONS

Japan Patent Office, "Notification of Reasons for Rejection", Jan. 20, 2009, Published in: JP.

*Primary Examiner*—Thomas H Tarcza
*Assistant Examiner*—Peter M Bythrow
(74) *Attorney, Agent, or Firm*—Fogg & Powers LLC (57) ABSTRACT

Provide an on-vehicle radar device that performs transmission control of a monitoring signal, following fixed rules, so that interference with other radar devices can be avoided with certainty. An on-vehicle radar device comprises a transceiver which transmits/receives a monitoring signal at a specified frequency band and transmits a priority order signal at a frequency within the above-mentioned frequency band, and a controller which switches the signals transmitted by the transceiver. The transceiver receives a priority order signal of another radar device, and when interference with the signal of the other radar device is detected, the controller, based on the priority order of that other device and on the priority order of the device itself, shifts, by a specified frequency amount, the frequency band of the monitoring signal transmitted by the transceiver.

5 Claims, 10 Drawing Sheets

U.S. PATENT DOCUMENTS

| | | |
|---|---|---|
| 7,109,916 B2 * | 9/2006 | Klinnert et al. .............. 342/134 |
| 2002/0003488 A1 * | 1/2002 | Levin et al. .................... 342/70 |
| 2004/0028003 A1 * | 2/2004 | Diener et al. ............... 370/319 |
| 2004/0157580 A1 * | 8/2004 | Stadelmeier et al. ........ 455/338 |
| 2005/0179584 A1 * | 8/2005 | Ohlsson ...................... 342/124 |
| 2005/0192016 A1 * | 9/2005 | Zimmermann et al. ...... 455/450 |
| 2006/0164292 A1 * | 7/2006 | Buechler et al. .............. 342/52 |
| 2007/0164896 A1 * | 7/2007 | Suzuki et al. ................. 342/70 |

FOREIGN PATENT DOCUMENTS

| | | |
|---|---|---|
| DE | 19642810 | 4/1998 |
| EP | 1775600 | 4/2007 |
| GB | 2408645 | 6/2005 |
| JP | 05-264727 | 10/1993 |
| JP | 06-160512 | 6/1994 |
| JP | 08-105963 | 6/1996 |
| JP | 2932210 | 5/1999 |
| JP | 2002-513468 | 5/2002 |
| JP | 2002-168947 | 6/2002 |
| JP | 3345374 | 8/2002 |
| WO | 2004048999 | 6/2004 |
| WO | 2006013615 | 2/2006 |

* cited by examiner

ON-VEHICLE RADAR DEVICE AND ON-VEHICLE RADAR DEVICE CONTROL SYSTEM

CROSS-REFERENCE TO RELATED APPLICATIONS

This application is based upon and claims the benefit of priority from the prior Japanese Patent Application No. 2006-092964, filed on Mar. 30, 2006, the entire contents of which are incorporated herein by reference.

BACKGROUND OF THE INVENTION

1. Field of the Invention

The present invention relates to an on-vehicle radar device and on-vehicle radar control system, and in particular to an on-vehicle radar device and on-vehicle radar control system which avoid interference between radar devices by shifting the frequency band or transmission period of the monitoring signal.

2. Description of the Related Art

As vehicle preventative safety systems, a variety of on-vehicle radar devices have been proposed that detect the distance to a vehicle running ahead and the relative speed. As these radar devices become more widely adopted, there is a growing danger that as vehicles each of which has an on-vehicle radar device approach one another, interference between their radar devices will occur. To deal with this, a method is needed whereby interference between these on-vehicle radar devices can be avoided.

For example, in Patent Reference 1, a method is disclosed whereby in an FM-CW radar device that modulates the frequency of a monitoring signal, a transmitted signal and a received signal are mixed in a mixer, and interference is detected by measuring the frequency of the output signal of that mixer. Further, a method is disclosed whereby, upon detecting interference, the frequency band of the transmitted signal and/or the modulation cycle of the frequency is/are changed in order to avoid interference.

[Patent Reference 1] Japanese Patent Laid-Open Publication No. 2002-168947

However, with the conventional technique there is the following kind of problem. That is, even if in order to avoid interference among plurality of radar devices of the same model, the frequency band and/or the modulation cycle of the frequency are changed, if the operation of each is not done in an organized manner, eventually interference will reoccur. In other words, if after changing, the frequency bands of the transmitted signals and/or the modulation cycles are not different one to the other, it is not possible to avoid interference with certainty.

Also, although it is true that interference could certainly be avoided if each radar device were allocated its own frequency band, it is not realistic to allocate in the commercial-use frequency band of 76.0 GHz to 77.0 GHz a different band to all the countless radar devices that exist.

SUMMARY OF THE INVENTION

To deal with this, an object of the present invention is to provide an on-vehicle radar device and the like which controls monitoring signals so that, within a dedicated band that can be set for a radar application, interference with other radar devices can be avoided with certainty.

To achieve the above-indicated object, according to a first aspect of the present invention, in a on-vehicle radar device having a transceiver which transmits/receives monitoring signals in a specified frequency band and transmits a priority order signal at a frequency within that frequency band, and a controller which alternately switches the monitoring signals and the priority order signal transmitted by the transceiver, the transceiver receives a priority order signal of another radar device, and the controller, in the case when interference with the signal of the other radar device is detected, based on the priority order of the other device and the priority order of the above-indicated device itself, shifts, by a specified frequency, the frequency band of the monitoring signal transmitted by the transceiver.

By means of the above-mentioned first aspect, because, based on the relative priority order relative to another device, each device shifts the frequency band of its transmitted signal, overlap of the frequency band after shifting with other devices can be prevented and interference can thus be avoided.

According to a second aspect of the present invention, in an on-vehicle radar device having a plurality of monitoring signal transceivers, the transceivers are arranged to point in the various different directions from the vehicle and each of the transceivers transmits/receives a monitoring signal at a different frequency band.

By means of the above-mentioned second aspect, interference between the monitoring signal transmitted from the radar device mounted on a vehicle running ahead for monitoring the aft direction and the monitoring signal transmitted from the radar device of the device itself for monitoring the forward direction can be avoided.

According to a third aspect of the present invention, in an on-vehicle radar device having a transceiver which transmits a monitoring signal in a specified frequency band, a controller which repeats alternately a transmission period of a specified length during which the monitoring signal of a specified frequency band is transmitted by the transceiver and a pause period of a specified length during which no monitoring signal is transmitted by the transceiver, a position-information acquiring unit which acquires the position of the device itself, and a communication unit which communicates with a control center, the communication unit transmits to the control center position information of the device itself and a priority order thereof. Then the control center, based on the position information received from the radar device, finds the distance between the radar device and other radar device, and in the case that other radar device exists within a range of a specified distance, based on the priority order of the devices, transmits an instruction to shift the transmission period or the monitoring-signal frequency band. Then, the controller, following the instruction received from the control center, changes the transmission period or the monitoring-signal frequency band.

By means of the radar device of the above-mentioned third aspect, interference with other devices can be more surely avoided by following an instruction from the control center, which has grasped the position of other nearby devices, and shifting the frequency band or transmission period.

By means of the radar device of the present invention, it is possible with certainty to avoid interference with other radar devices in the range of the available frequency band and to do so efficiently.

BRIEF DESCRIPTION OF THE DRAWINGS

FIGS. 2 (A) and 2 (B) are drawings that describe the frequency band of the monitoring signal by the on-vehicle radar device.

FIGS. 3 (A), 3 (B) and 3 (C) are drawings that describe the case where interference occurs between the monitoring signal and the priority order signal.

FIGS. 6 (A) and 6 (B) are waveform diagrams that describe the operation of an on-vehicle radar device in avoiding the reoccurrence of interference with another device.

FIGS. 8 (A), 8 (B), and 8 (C) are diagrams that describe an on-vehicle radar device that scans the four directions of a vehicle.

DESCRIPTION OF THE PREFERRED EMBODIMENTS

Below, embodiments of the present invention will be described, according to the figures. However, the technical scope of the present invention is not limited by these embodiments, but extends to the items written in the patent claims and to equivalents thereto.

Figure 1:
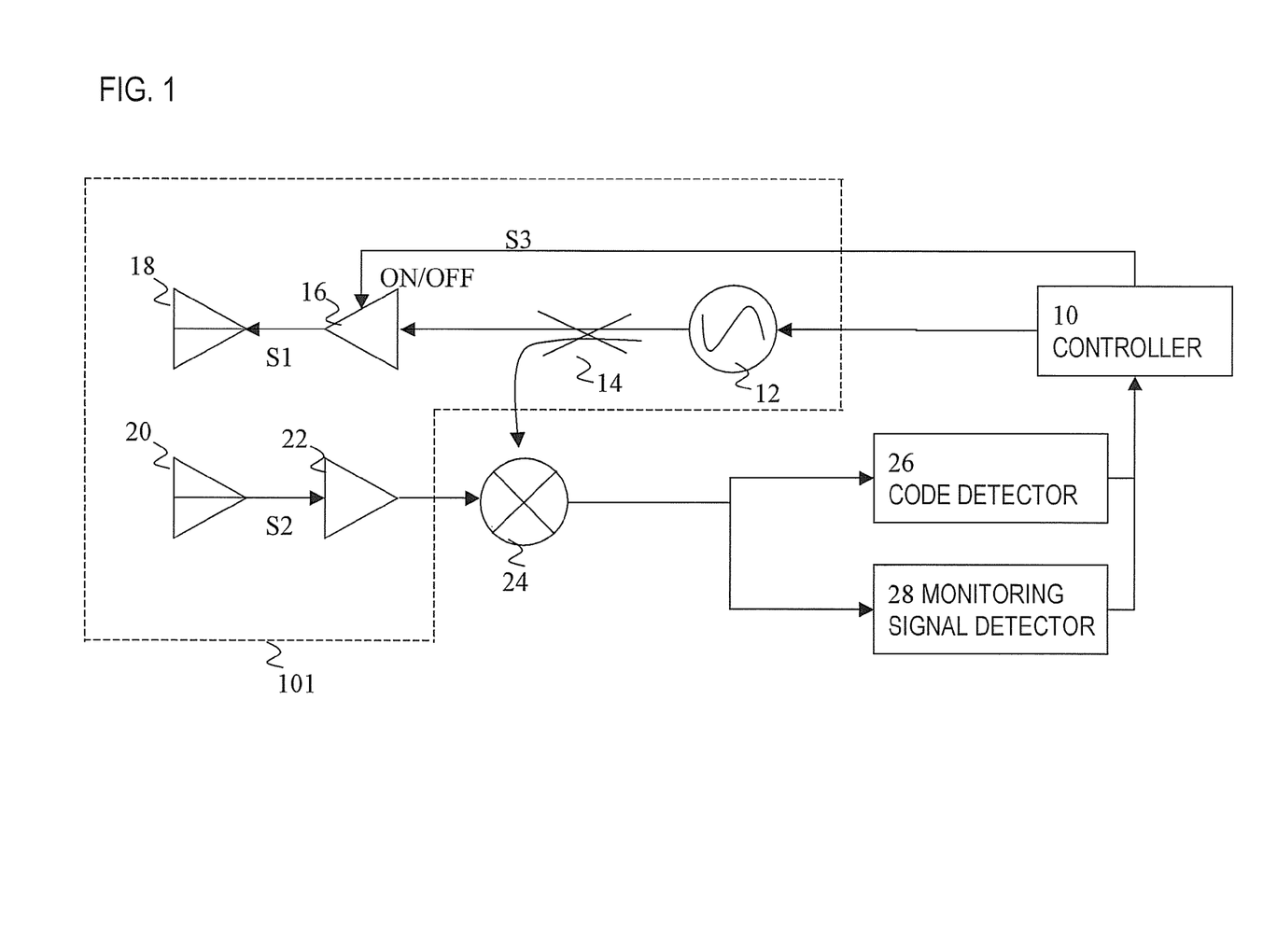
FIG. 1 is a configuration drawing of the on-vehicle radar device according to the present embodiment.

FIG. 1 is a configuration drawing of the on-vehicle radar device of the present embodiment. This on-vehicle radar device is an FM-CW radar device that performs frequency modulation of the transmitted signal, and is configured of a controller 10, an oscillator 12, a directionality coupler 14, a transmission amplifier 16, a transmission antenna 18, a reception antenna 20, a reception amplifier 22, a mixer 24, code detector 26, and a monitoring signal detector 28.

The on-vehicle radar device configured as indicated above, following a pre-determine rule, repeats alternately the operation of transmitting/receiving a monitoring signal frequency modulated by a constant frequency band width and the operation of transmitting/receiving priority order information at an appropriate frequency set within the band of the above-indicated monitoring signal. The on-vehicle radar device also performs transmission control, in order to avoid monitoring signal interference with another on-vehicle radar device of the same configuration mounted on another vehicle, based on the priority order of that other on-vehicle radar device that it has received from that device and on the priority order of the device itself.

First the transmission operation in the above-mentioned configuration will be explained. In the case of transmitting the frequency modulated monitoring signal, the controller 10 generates a modulation signal and inputs it to the oscillator 12. Then the oscillator 12 generates a high frequency signal having a band dependent on the input of the modulation signal. The directionality coupler 14 divides this high frequency signal is divided into a component that, passing through the transmission amplifier 16, is used as the monitoring signal and a component that, inputted to the mixer 24, is used a signal for demodulation. The transmission amplifier 16 amplifies the transmission signal inputted thereto and the transmission antenna 18 emits the amplified transmission signal S1 as an electromagnetic wave.

Also, in the case of transmitting the priority order signal, the controller 10 generates a signal for setting the unmodulated output signal from the oscillator 12 to an appropriate fixed frequency set within the frequency band of the monitoring signal. For example, in the case that the oscillator 12 is a voltage-controlled oscillator, the controller 10 generates the DC offset, and inputs it to the oscillator 12 so that a high frequency signal having the set frequency is generated. Then, the controller 10 reads out, from a memory device provided within the controller 10 but not shown in the figure, the priority order of the device itself, and by means of the encoding signal S3 of a specific frequency that depends on that priority order code, turns on or off the bias voltage of the transmission antenna 16. By this means, the transmission amplifier 16 outputs an ASK-modulated signal (or a PSK-modulated signal) of a specific frequency corresponding to the priority order code, and the transmission antenna 16 emits that signal. Further, "priority order" is information that determines the order among the devices, based on a constant criterion such as, for example, the serial number of the on-vehicle radar device.

Figure 3A:
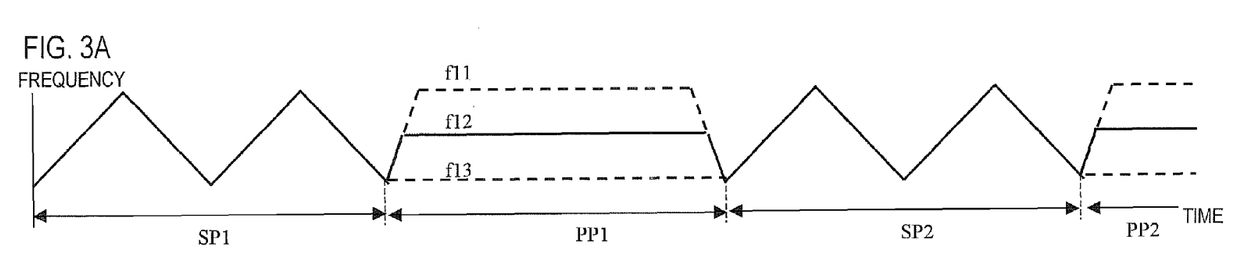

For example, as shown in FIG. 3 (A) in which wave form diagram represents the signals transmitted by the on-vehicle radar device with a triangle wave portion being the frequency modulated monitoring signal and with a straight line portion being the priority-order signal at the center frequency f12 of the modulation frequency of the monitoring signal, the controller 10 switches alternately transmitting the monitoring signal in the periods SP1, SP2, . . . and the priority-order signal in the periods PP1, PP2, . . . . . A pair of triangle waves in each of the periods SP1, SP2, . . . are shown as an example, however, the number of the triangle waves in each period can be set to any number at will. Also as a preferable embodiment, the controller 10 switches alternately among the priority-order signal transmitting periods PP1, PP2, . . . the frequency for the priority-order signal, sequentially between the center frequency f12 of the modulation frequency of the monitoring signal, the maximum frequency f11, or the minimum frequency f13.

Next, the reception operation will be explained. The emitted electromagnetic wave is reflected by an object, such as a vehicle in front, and that reflected wave is received by the reception antenna 20. The reception signal S2 is amplified by the reception amplifier 22 and is inputted into the mixer 24. The mixer 24 mixes a portion of the transmitted signal and the received signal, and generates a beat signal with its frequency the difference between the frequency of the transmitted signal and the frequency of the received signal. And the mixer 24 inputs the beat signal into the monitoring signal detector 28. The monitoring signal detector 28 measures the frequency of the beat, and calculates the distance to the object and the relative speed. The monitoring signal detector 28 also detects interference by comparing the frequency, amplitude, and the like of the beat signal to threshold values.

In the above-mentioned on-vehicle radar device, the controller 10 corresponds to the "controller," and, the oscillator 12, the transmission amplifier 16, the transmission antenna 18, the reception antenna 20, and the reception amplifier 22 correspond to the transmitter/receiver ("transceiver 101").

Figure 3B:
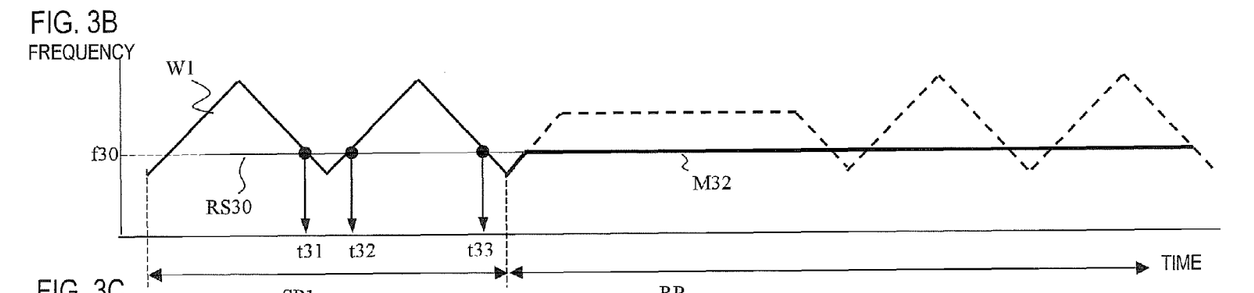

Controller 10, when the monitoring signal detector 28 detects interference, specifies, by specifying the time of the interference occurrence, the instantaneous frequency of the monitoring signal of the device itself at the time that interference occurred. For example, as shown in FIG. 3 (B), the triangle wave W1 which represents the frequency modulated monitoring signal of the device itself interferes with the priority-order signal RS30 of other devices with the same configuration as the device itself at times t31, t32, and t33. In this case, the controller 10 of the device itself specifies the interference wave frequency f30 by specifying each time point of the occurrences of the interference. Then, the controller 10 stops the frequency modulation and also, the specified frequency f30 (straight line M32) is set as the local frequency of the mixer 24. Then, the mixer 24 generates from the interfered signal that was received and the transmission signal of the set local frequency a baseband signal. And the code detector 26 detects the ASK-modulated priority-order signal of the other device from that baseband signal.

Since the frequency band of the monitoring signal of that other device includes the frequency of the priority-order signal of that device, in the case that the priority-order signal of the other device and the monitoring signal of the device itself interfere, that means that the frequency band of the monitoring signal of that other device and the frequency band of the monitoring signal of the device itself are overlapping. There, the controller 10, by means of a procedure explained later, compares the priority order of the other device and the priority order of the device itself and if the priority order of the device itself is lower, inputs to the oscillator 12 a modulation signal such that the frequency band for the monitoring signal of the device itself is shifted to a lower frequency.

Figure 2A:
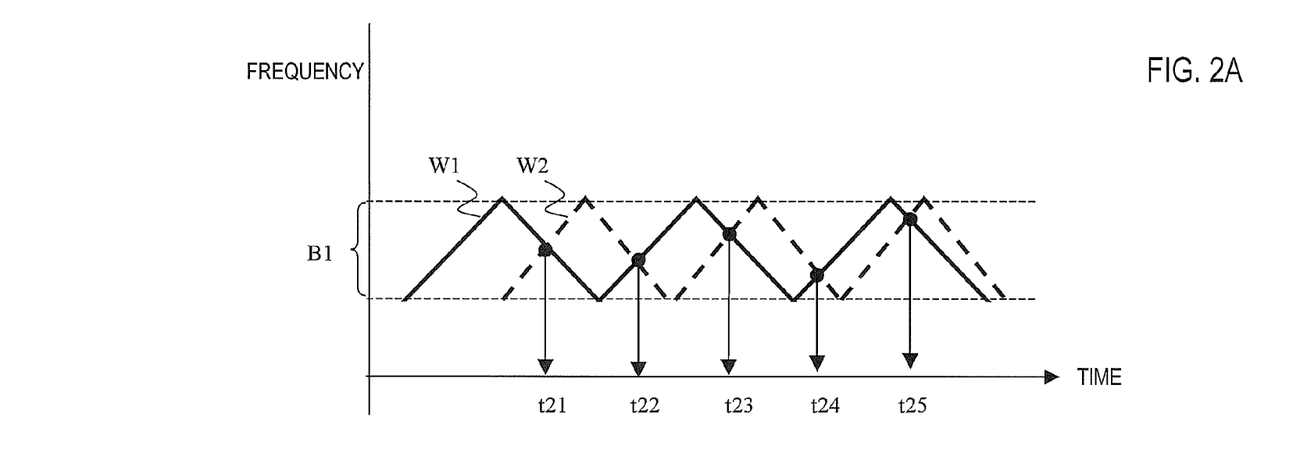
Figure 2B:
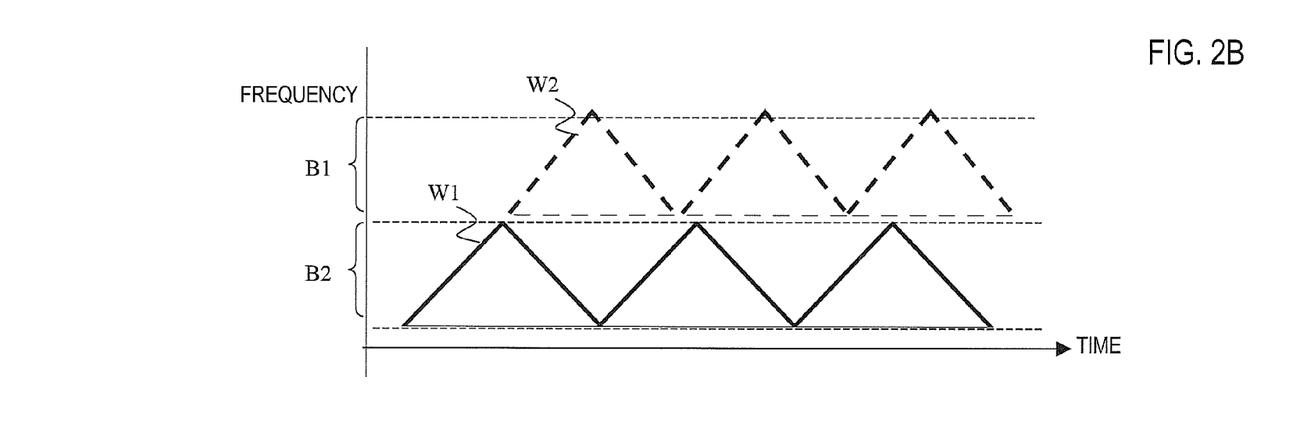

Here, the operation of shifting the frequency band is explained using FIGS. 2 (A) and 2(B). FIG. 2 (A) and FIG. 2 (B) are both waveform diagrams of the triangle wave that represents the frequency modulated monitoring signal, and in them the horizontal axis shows elapsed time and the vertical axis shows frequency. Waveform W1 represents the monitoring signal of the device itself, while waveform W2 represents that of the other device. FIG. 2 (A) shows that two devices are using frequency band B1, for example from 76.4 GHz to 76.6 GHz, and thus overlap, and that at the time points where the waveforms intersect, t21, t22, and t23, . . . , the devices are transmitting monitoring signals at the same instantaneous frequency. Thus, at time points like those, interference of the monitoring signal of the device itself with the monitoring signal of other device occurs, and an error occurs in the beat signal generated by the mixer 24 of the device itself.

There, interference can be avoided by shifting the frequency band, as shown by FIG. 2 (B). For example, if as a result of comparison of the priority orders, the device itself has a lower priority order, a shift is made to the low frequency band B2. The shift width may be one half of the frequency modulation width of the device itself, or may be preset to 50 MHz or the like. In the case that, after one instance of the shifting operation, the frequency bands still overlap and interference reoccurs, the operation of shifting the frequency band is repeated until the maximum frequency of the device itself is below the minimum frequency of the other device. By doing this, overlap of the frequency bands used by the two devices is eliminated, and reoccurrence of interference can be avoided.

In other words, a feature of the present embodiment is that, in order to avoid reoccurrence of interference between on-vehicle radar devices performing the same operation, each device orderly controls the frequency band of its monitoring signal, following preset rules. The said shifting operation of frequency band also can be such that if the priority order of the device itself is high, the frequency band is shifted higher until the minimum frequency of the device itself is above the maximum frequency of the other device, or, the device itself does not change the frequency band.

Figure 3C:
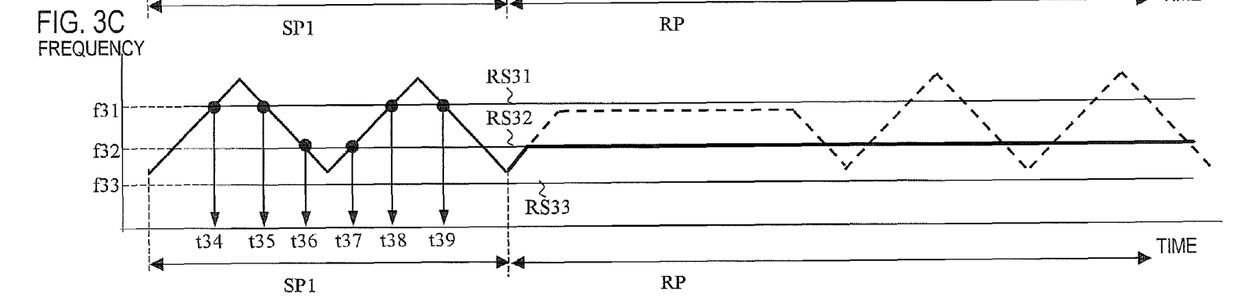

FIGS. 3 (A), 3 (B), and 3 (C) are drawings that describe the case where interference occurs between the monitoring signal and the priority-order signal. As mentioned above, the wave diagram of FIG. 3 (A) describes the transmission operation that alternately transmits the monitoring signal and the priority-order signal. Next the reception operation in the case that interference with the priority-order signal of another device occurs will be explained using FIG. 3 (B). Also, as a preferable embodiment, the above-mentioned on-vehicle radar device transmits the priority-order signal, switching sequentially between the center frequency of the modulation band, its maximum frequency, and its minimum frequency. In that case, FIG. 3 (C) describes the case of occurrence of interference with the priority-order signal of another device.

First, as shown in FIG. 3 (A), the on-vehicle radar device of the present embodiment repeatedly alternates between SP1, SP2, . . . the monitoring signal transmission periods and PP1, PP2, . . . the priority-order signal transmission periods. When this is done, there may be cases when the transmission period of the monitoring signal or the priority-order signal of another device doing the same operation may overlap with the transmission period of the device itself, and interference may occur.

FIG. 3 (B) is a waveform diagram of the case where interference occurs within the monitoring signal transmission period SP1 of the device itself due to the priority-order signal RS30 of another device. The interference that occurred at times t31, t32, and t33 is detected by the monitoring signal detector 28 together with the reflected wave of the monitoring signal from the device itself. Then the interference wave frequency f30 is found by back-calculating from the transmission time of the transmitted wave. And transmission of the monitoring signal is paused and also the mixer frequency is set to f30 (straight line part M32) so that the code detector 26 acquires the priority order of the other device. To do this operation, the device itself pauses transmission of signal(s) other than those provided to the mixer 28 to make a readout period RP, and for priority-order transmission period PP1 and thereafter, the readout operation is performed. In this way, in the case that interference occurs, the priority order of the other device can be acquired with certainty.

FIG. 3 (C) shows during the transmission period (SP1) of the monitoring signal of the device itself, the instantaneous frequency in the case that the other device transmits alternately the priority-order signal RS31 at the maximum modulation width frequency f31, the priority-order signal RS32 at the center frequency f32, or the priority-order signal RS33 at the minimum frequency f33. FIG. 3 (C) shows the case that the maximum frequency f31 and the center frequency f32 of the monitoring signal of the other device are included within the frequency band of the monitoring signal of the device itself and that interference in the monitoring signal of the device itself and priority-order signal R31 and R32, at the time points t34, t35, . . . , t38, and t39 occur. In this case, a transition is made to the readout period RP at either of the frequencies of detected interference wave f31 or f32 and the above-mentioned readout operation is performed. By this means, the priority order of the other device can be acquired with certainty and also the maximum or the center frequency of the monitoring signal of the other device can be acquired.

On the other hand, in the case that the minimum frequency f33 of the monitoring signal of the other device is included within the frequency band of the monitoring signal of the device itself and that interference with the priority-order signal from the other device RS33 at the frequency f33 is detected, by means of processing the same as described above, the minimum frequency f33 of the monitoring signal of the other device can be acquired. In this way, since the width of the frequency band of the monitoring signal of the other device is preset and identified by any of the maximum, minimum, or the center frequency of the frequency band that are acquired, the frequency band of the monitoring signal of the other device can be acquired. Then, the frequency band of the device itself can be shifted in such a way that the overlapping with the frequency band of the other device is avoided, hence, the danger of interference can promptly be eliminated.

Note that in the description given above, an FM-CW radar device which turns on and off a monitoring signal was used as an example, but even in the case of a normal radar device which is constantly transmitting and receiving a monitoring signal, it is possible to avoid the reoccurrence of interference with the other device, by shifting the frequency band in the same manner. In such case, the monitoring signal and the priority-order signal may be transmitted within the same frequency band.

Figure 4:
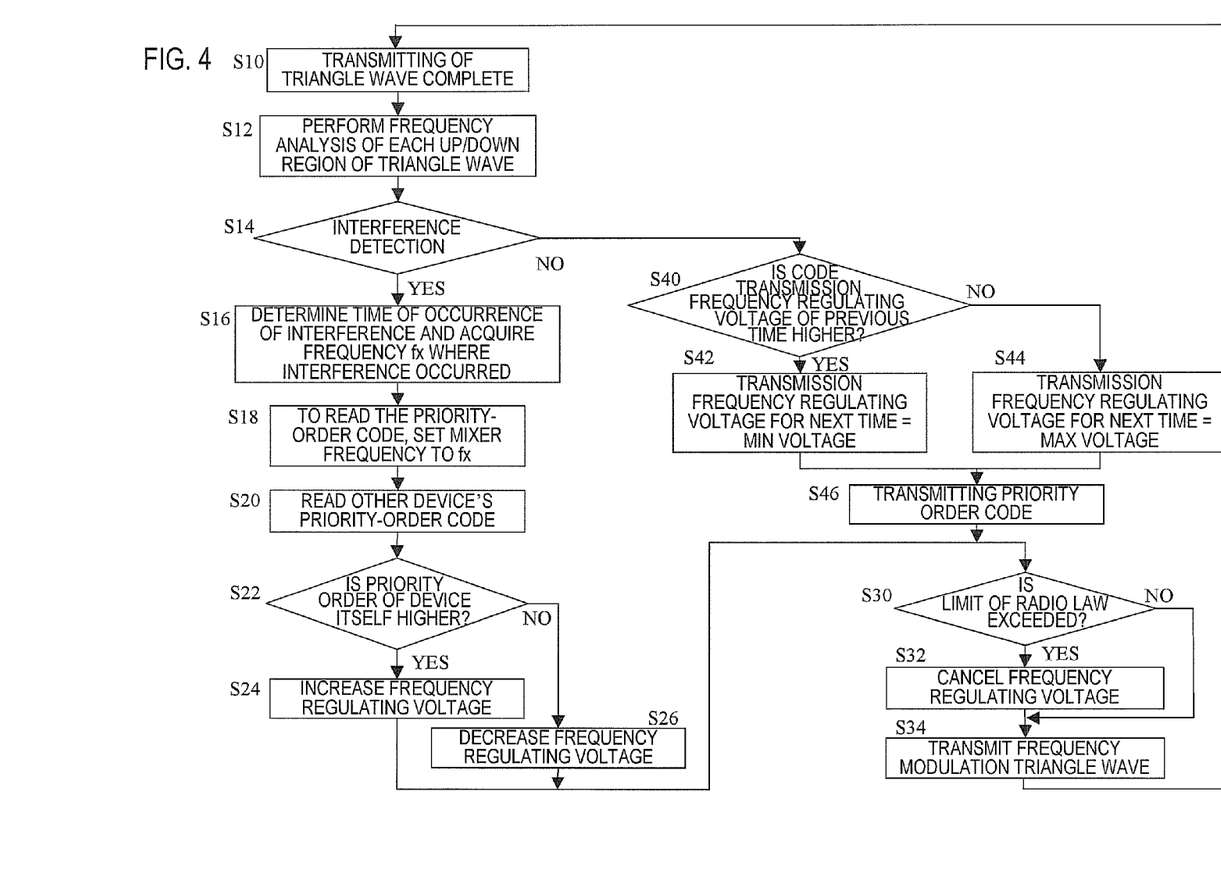
FIG. 4 is a flow chart diagram that describes the operation procedure of the on-vehicle radar device.

FIG. 4 is a flow chart diagram that describes the operation procedure of the on-vehicle radar device of the above-mentioned embodiment. This flow chart diagram describes the procedure by which the controller 10 controls the operation of each part of the on-vehicle radar device, following a control program.

First, upon completion of transmitting the monitoring signal frequency modulated by the triangle wave (S10), frequency analysis of the received signal is performed for the rising region of the triangle wave and for the falling region thereof (S12). Then, upon detecting interference by the monitoring signal detector 28 (YES at S14), the time of the interference is identified and the instantaneous frequency fx of the interference wave is acquired (S16). Then the frequency of the local oscillator 12 is set at fx (S18). Then signal generated by the oscillator 12 and the interference signal are mixed by the mixer 24, and the priority-order code of the other device is read out (S20).

Next, the priority order of the other device and the priority order of the device itself are compared, and if the priority order of the device itself is higher (YES at S22), the frequency regulating voltage is increased (S24) in order to shift the monitoring signal frequency band of the device itself higher. On the other hand, if the priority order of the device itself is lower (NO at S22), the frequency regulating voltage is lowered (S26) in order to shift the monitoring signal frequency band of the device itself lower.

Further, in the case that it can be predicted, based on air temperature, the bias voltage applied to the oscillator 12, and the like, that if the frequency band is shifted, there will be a deviation from the range of 76.0 GHz to 77.0 GHz which are the limits set by the Radio Law (YES at S30), the frequency regulating voltage is cancelled (S32). On the other hand, in the case that it is within the range delimited by the Radio Law, (NO at S30), the monitoring signal, frequency modulated by the triangle wave by means of the increased or decreased frequency regulating voltage, is transmitted (S34).

Note that in step S14, in the case that interference is not detected (NO at S14), if, upon comparing the transmission frequency regulating voltage of the priority-order signal transmitted from the device itself the previous time (priority-order signal transmission period) and the transmission frequency regulating voltage of the next time (priority-order signal transmission period), the transmission frequency regulating voltage of the previous time is higher (YES at S40), the transmission frequency regulating voltage next time is set at the minimum value (S42), and the priority-order signal is transmitted at the minimum frequency of the monitoring signal of the device itself (S46). On the other hand, if the transmission frequency regulating voltage of the previous time is lower (NO at S40), the transmission frequency regulating voltage next time is set at the maximum value (S44), and the priority-order signal is transmitted at the maximum frequency of the monitoring signal of the device itself (S46). And the above procedure is repeated.

With the on-vehicle radar device that operates according to the above procedure, in the case that interference occurs, the priority order of the other device can be acquired with certainty. And in the case that the maximum and minimum frequency of the frequency band of the monitoring signal of the other device are acquired in the repetition of the procedure from one monitoring-signal transmission period to another, the frequency band of the monitoring signal of the other device that must be avoided can also be acquired. Thus, in such a case, the frequency band of the device itself is shifted so as to avoid overlapping with the frequency band of the other device, and the danger of interference can promptly be eliminated.

Next, the on-vehicle radar device of a different aspect of the present invention is described. This on-vehicle radar device repeatedly alternates constant transmission periods for transmitting the monitoring signal and constant pause periods of no transmission. This on-vehicle radar device has the feature that, in the case that interference with another on-vehicle radar device is detected, it shifts the start of the monitoring-signal transmission period by a specified time and thus avoids the reoccurrence of interference.

The above-mentioned on-vehicle radar device is achieved through the configuration described in FIG. 1. For the modulation method for the signal transmitted, any of frequency modulation, amplitude modulation, phase modulation, or other such methods is applicable, and the controller 10 generates a modulated signal according to the modulation method. The operation of this on-vehicle radar device in the case that the monitoring signal detector 28 detects interference with another on-vehicle radar device is described using FIG. 5.

Figure 5:
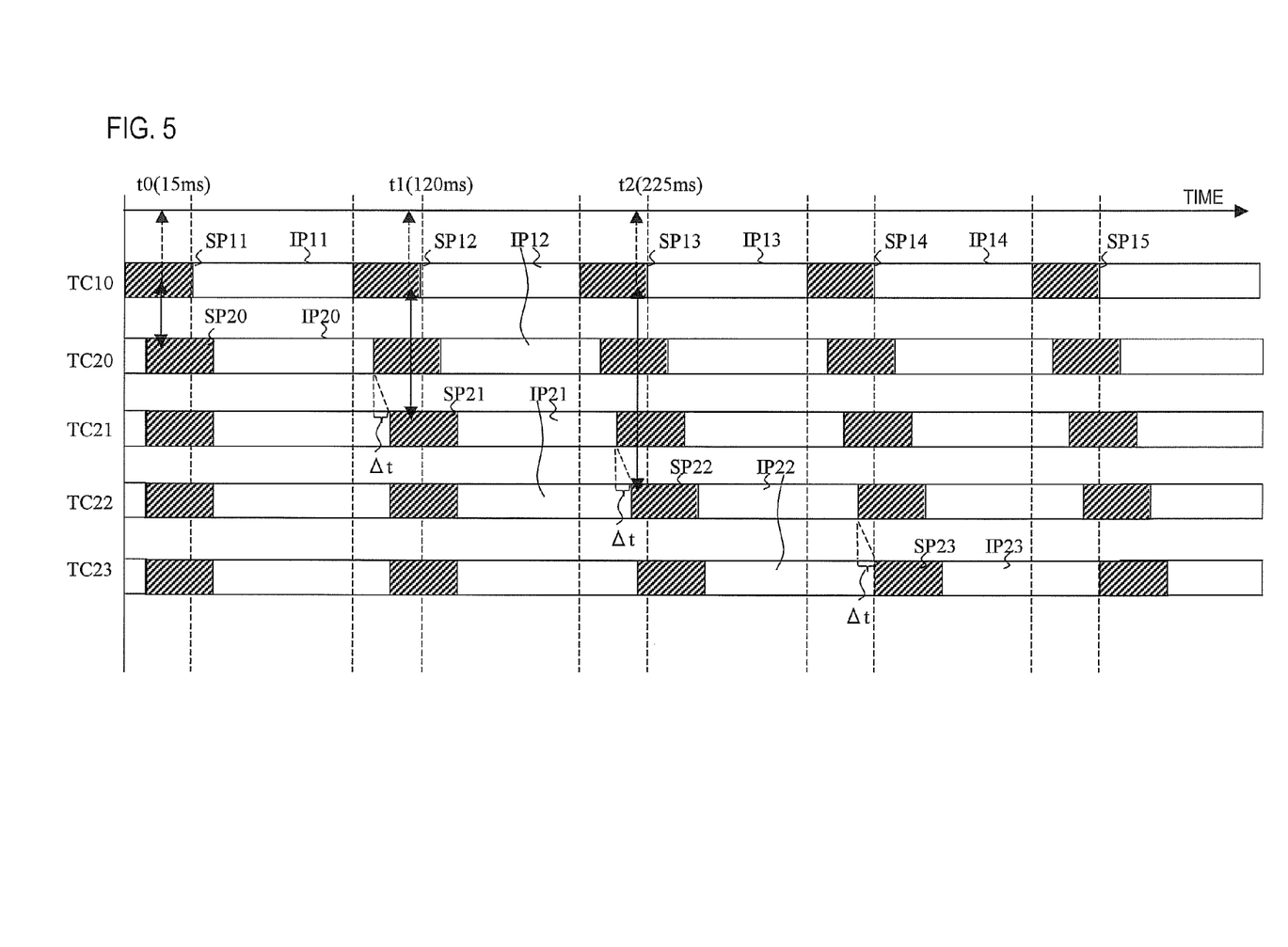
FIG. 5 is a chart that shows a frame format of the timing of the transmission operations of the device itself and another device.

FIG. 5 is a chart that shows a frame format of the timing of the transmission operations of the device itself and another device. The horizontal axis shows elapsed time and the chart of TC10 represents the time periods when the other device performs transmission and pause operations, and the chart of TC20, 21, 22, . . . , 23 represents the time periods when the device itself performs transmission and pause operations. In each chart, the diagonally hatched regions represent transmission periods and the blank regions represent pause periods. In each of the charts, the transmission periods and pause periods are each constant and they are repeated alternately.

Here the transmission period and the pause period are determined ahead of time according to the following type of rule. For example, for the total time of one cycle of a transmission period and a pause period, 10 ms is taken as the minimum unit and one cycle is made an integral multiple thereof. Furthermore, the transmission period is made to be 30% or less of one cycle. Thus, for example, in the chart of FIG. 5, a description is given wherein the transmission period is 30 ms and the pause period is 70 ms.

First, if the chart of the other device TC10 and the chart of the device itself TC20 are compared, there is an overlap of transmission periods SP11 and SP20, so there will be cases where interference due to the other transmission signal occurs. For example, interference is detected by the device itself at time t0 (a time point of 15 ms), which occurs in transmission period SP11 of the other device and transmission period SP20 of the device itself.

When that happens, the pause period IP20 of the device itself following transmission period SP20 in which interference was detected is extended by a time $\Delta t$, as shown in chart TC21. Here, the time $\Delta t$ is made to be 5 ms. If this is done, the next transmission period SP21 of the device itself begins after the passage of a pause period of 75 ms. However, the transmission period SP21 overlaps with transmission period SP12 of the other device (chart TC10) and again at time t1 (120 Ms) interference is detected.

Then, the device itself again extends the pause period IP21 following transmission period SP21 in which interference was detected is by a time Δt, as shown in chart TC22. If this is done, the next transmission period SP22 begins after the further passage of a pause period of 75 ms, but at that next transmission period SP22, there is still overlapping with transmission period SP13 of the other device (chart TC10) and again at time t2 (a time point of 225 ms) interference is detected.

However, if the above operation is repeated and the pause period after a transmission period for which interference is detected is extended by a time Δt each time, a time point will be reached when the transmission period SP23 and the pause period IP23 of the device itself in chart TC23 will correspond respectively to the pause period IP14 and the transmission period SP15 of the other device (in chart TC10) and when overlapping of the transmission periods of the two devices can thus be avoided.

In the manner described above, by repeatedly adjusting the beginning of the transmission period by a specified amount each time, the on-vehicle radar device of the present embodiment can avoid the reoccurrence of interference with other radar devices. In other words, among on-vehicle radar devices that repeat at regular intervals designated length of transmission period and a pause period, the reoccurrence of interference between on-vehicle radar devices doing the same operation can be avoided by having the device that detected interference perform an orderly control operation following preset rules.

Further, because the electrical power of the interfering signals is proportional to the time during which interference is actually occurring, the above-described processing may be performed by using general value for time Δt that can be determined by dividing the interference-signal electrical power by the period of the modulating signal.

Also, as a variation of the on-vehicle radar device of the above-described different aspect, a on-vehicle radar device will be described using FIGS. 6 (A), 6 (B) and FIG. 7 wherein the on-vehicle radar device is an FM-CW radar device and it performs frequency modulation at a pre-determined modulation period and modulation width. Moreover, the length of the transmission period and the length of the pause period are integral multiples of the length of the modulation period.

Figure 6A:
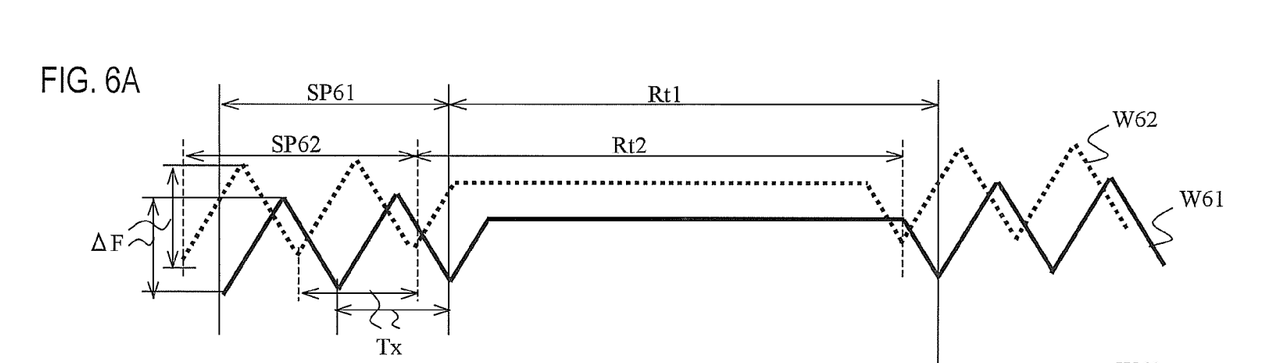
Figure 6B:
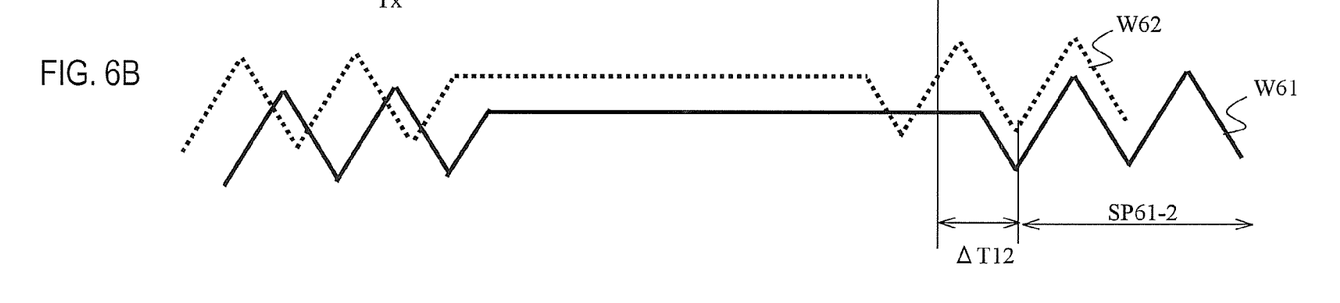

FIGS. 6 (A) and 6 (B) are waveform diagrams that describe the operation of the above-mentioned on-vehicle radar device in avoiding the reoccurrence of interference with another device. Both FIGS. 6 (A) and (B) are waveform diagrams of the modulation input signal (triangle wave portion) for generating a monitoring signal, and in the figures the horizontal axes are elapsed time and the vertical axes are instantaneous frequency. Waveform W61 and waveform W62 represent respectively the monitoring signal of the device itself and that of the other device, and each of the waveforms repeatedly alternates a constant transmission period (triangle wave portion) and pause period (straight line portion).

As shown in FIG. 6 (A), for both the waveforms W61 and W62, the modulation periods Tx and modulation widths ΔF are equal, and both the pause period Rt1 and pause period Rt2 are integral multiples of the modulation period Tx. Also, the waveforms W61 and W62 have different center frequencies, the length and starting times of the transmission period SP61 and the transmission period SP62 are differed, and the length and starting times of the pause period Rt1 and the pause period Rt2 are also differed. However, focusing on the transmission period SP61 of the waveform W61, at the part where it overlaps with the transmission period SP62 of the waveform W62, the instantaneous frequencies intersect and interference occurs.

There, the device itself avoids the reoccurrence of interference by extending the pause period Rt1 and delaying the start of the next transmission period SP61-2. FIG. 6 (B) represents the case where the start of the transmission period SP61-2 has been delayed by ΔT12. As a result, in transmission period SP61-2 it is shown that because the two waveforms do not intersect, interference can be avoided.

In this way, because the two waveforms W61 and W62 have equal modulation periods and amplitude widths and are waveforms whose pause periods are an integral multiple of the modulation period, through the above-described operation of the device itself, the start time of the period for transmitting the triangle wave can be adjusted and one portion of the transmission period of the monitoring signal from the other device can be absorbed in the pause period of the device itself. If this is done, the waveforms W61 and W62 do not intersect during their transmission periods, and the reoccurrence of interference can be avoided.

Figure 7:
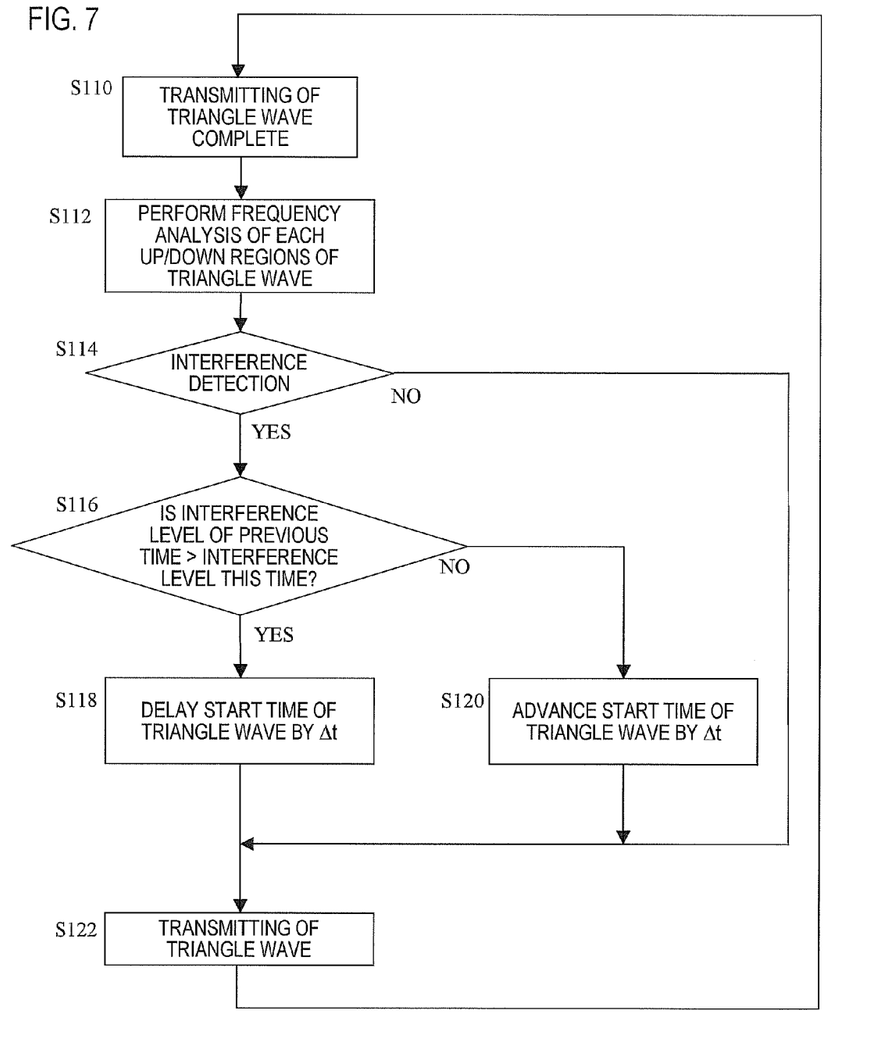
FIG. 7 is a flow chart diagram that describes the operation procedure of an on-vehicle radar device in performing frequency modulation at a pre-determined modulation period and modulation width.

FIG. 7 is a flow chart diagram describing the operation procedure of an on-vehicle radar device according to the above-described embodiment. This flow chart diagram describes the procedure by which the controller 10 controls the operation of each part of the on-vehicle radar device following a control program.

First, upon completion of transmitting the monitoring signal frequency modulated by the triangle wave (S110), frequency analysis of the received signal is performed for the rising region of the triangle wave and for the falling region thereof (S112). Then, upon the monitoring signal detector 28 detecting interference (YES at S114), the interference wave level of the previous time when interference occurred and the interference wave level this time are compared. And if the interference wave level this time is lower, the start of the transmission period is delayed by a specified time Δt (118) and the triangle wave of the next transmission period is transmitted (S122). On the other hand, if the interference wave level this time is higher, the start of the transmission period is advanced by a specified time Δt (S120), and the triangle wave of the next transmission period is sent (S122). Note that time Δt is a time unit that may be set at will, basing it on the frequency of a clock or the like.

In the case that the device itself detects interference, by repeating the above-mentioned procedure while the interference wave level is falling, the situation shown in FIG. 6 (B) will be reached. Thus, after that the reoccurrence of interference can be avoided.

Further, with the embodiment according to the above-mentioned aspect, in order to avoid the case where both devices simultaneously detect interference and each shifts the transmission period by means of the same operation, it is possible to read out the priority order code added to the monitoring signal of the other device. And it is possible to compare the priority order of the other device to the priority order of the device itself and have the device with the lower priority order perform the time-shift operation.

Next, as another different aspect of the present invention, the on-vehicle radar device of the configuration shown in FIG. 1 is described, wherein that on-vehicle radar device is provided with four units of transceiver which has a transmission antenna 18 and a reception antenna 20 in each of the four directions of the vehicle and thus surveys the forward direction, aft direction, left direction and right direction of the vehicle.

Figure 8A:
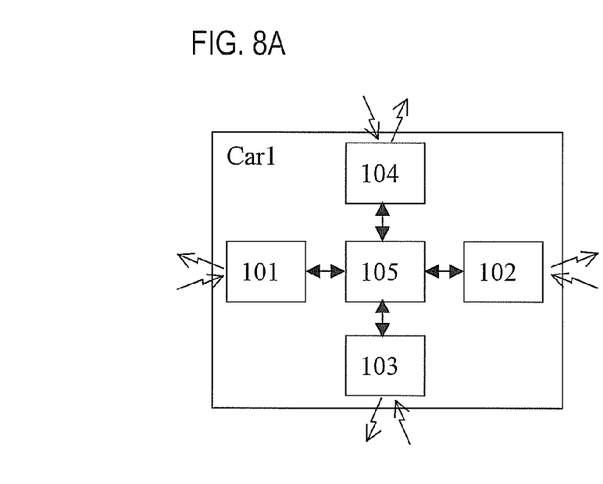

This on-vehicle radar device, as shown in FIG. 8(A) is provided with four sets of transceivers 101, 102, 103, and 104, each having the oscillator 12, the directionality coupler 14, the transmission amplifier 16, the transmission antenna 18, the reception antenna 20, the reception amplifier 22 and the mixer 24 shown in FIG. 1 which together configure the transceiver. And the transceivers 101, 102, 103, and 104 are connected with control unit 105 comprising controller 10, code detector 26, and monitoring signal detector 28 shown in FIG. 1. It is achieved with a configuration whereby the transceivers 101, 102, 103, and 104 are placed so that they point in the four directions from the vehicle Car1, forward, aft, left, and right, with one set for one direction, and the controller 10 of the control unit 105 controls the overall operation. For the modulation method for the signal transmitted, any of frequency modulation, amplitude modulation, phase modulation, or other such methods is applicable. The controller 10 generates a modulated signal according to the modulation method, and a monitoring signal is transmitted from each transceiver.

Figure 8B:
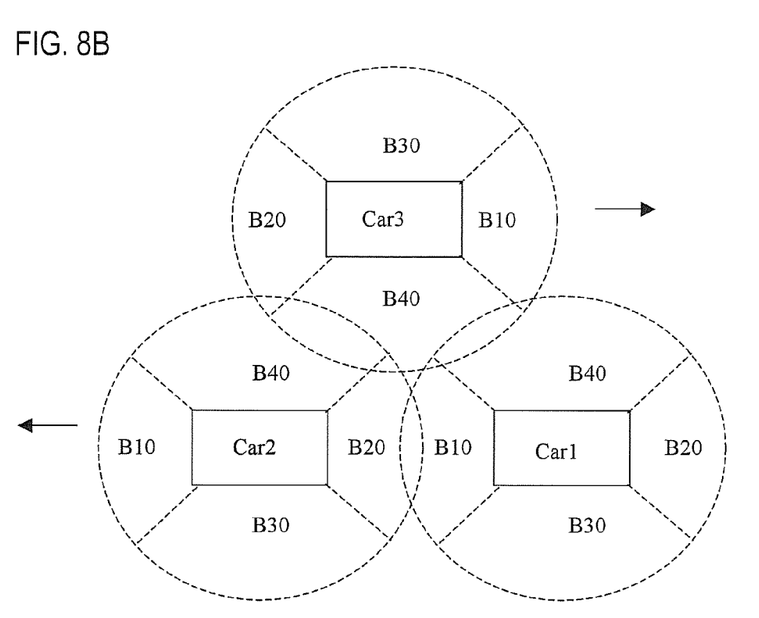

As shown in FIG. 8 (B), the on-vehicle radar device of the above-described configuration transmits monitoring signals in frequency bands B10, B20, B30, and B40, which do not overlap with each other, in the forward, aft, left and right directions of vehicle Car1 respectively. By doing this, when measuring the distance and the like to the vehicle running ahead, which is the most important for the vehicle itself Car1, in the case that the car running ahead Car2 is using the same on-vehicle radar, because the frequency band B20 of the monitoring signal transmitted in the aft direction from the vehicle running ahead Car2 and the frequency band B10 of the monitoring signal transmitted in the forward direction from the vehicle itself Car1 are different, no interference will occur.

Further, when vehicle Car3 in the opposing lane is passed, although the frequency band B40 of the monitoring signal of the right side of vehicle Car3 and the frequency band B40 of the monitoring signal of the right side of the vehicle itself Car1 are the same, because the time when interference could occur is an extremely short time, this situation causes no problem.

Figure 8C:
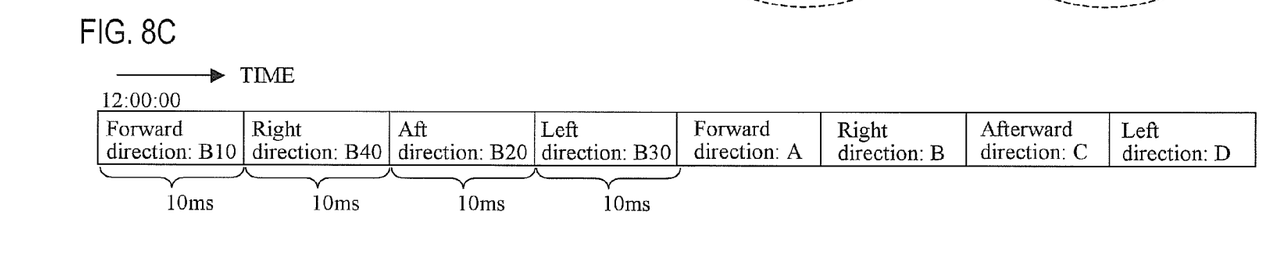

FIG. 8 (C) describes, as a variation on the above-described aspect of the present invention, operation whereby the transmission periods for transmitting a monitoring signal from the antennas that survey the four directions are switched alternately in sequence. The horizontal axis of the diagram represents elapsed time and the chart diagram shows that monitoring signals for the forward direction, right direction, aft direction, and left direction are transmitted in that order, each for 10 ms and at its respective frequency band. When the monitoring signal for one direction is being transmitted, transmission of the monitoring signals for the other three directions is paused.

As described above, even in the case that another vehicle having an on-vehicle radar device mounted thereon which performs the same operation exists nearby, by allocating the frequency bands according to the direction of monitoring the vehicle surroundings and further by alternating the transmission of the monitoring signal for each respective direction, the probability of interference can be lowered.

Moreover, by providing in the above-described variation of the on-vehicle radar device an absolute time acquisition unit, for receiving the absolute time from a "radio wave clock tower" or GPS satellite, it is possible to switch between the above-mentioned transmission period and the start time of the pause period based on absolute time. For example, as shown in the chart of FIG. 8 (C), it is also possible, starting from a time of 12 o'clock, 0 minutes and 0 seconds, for the monitoring signal in the forward direction to be transmitted on frequency band B10 for 10 ms and for the monitoring signal in the right hand direction to be transmitted on frequency band B40 for the next 10 ms, and thereafter for transmission to be done alternately in the aft direction on frequency band B20 and left direction on frequency band B30 for 10 ms each.

Next, as another aspect of the present invention, a on-vehicle radar device will be described which performs signal control following directions from a control center to avoid the reoccurrence of interference with other devices of vehicles nearby.

Figure 9:
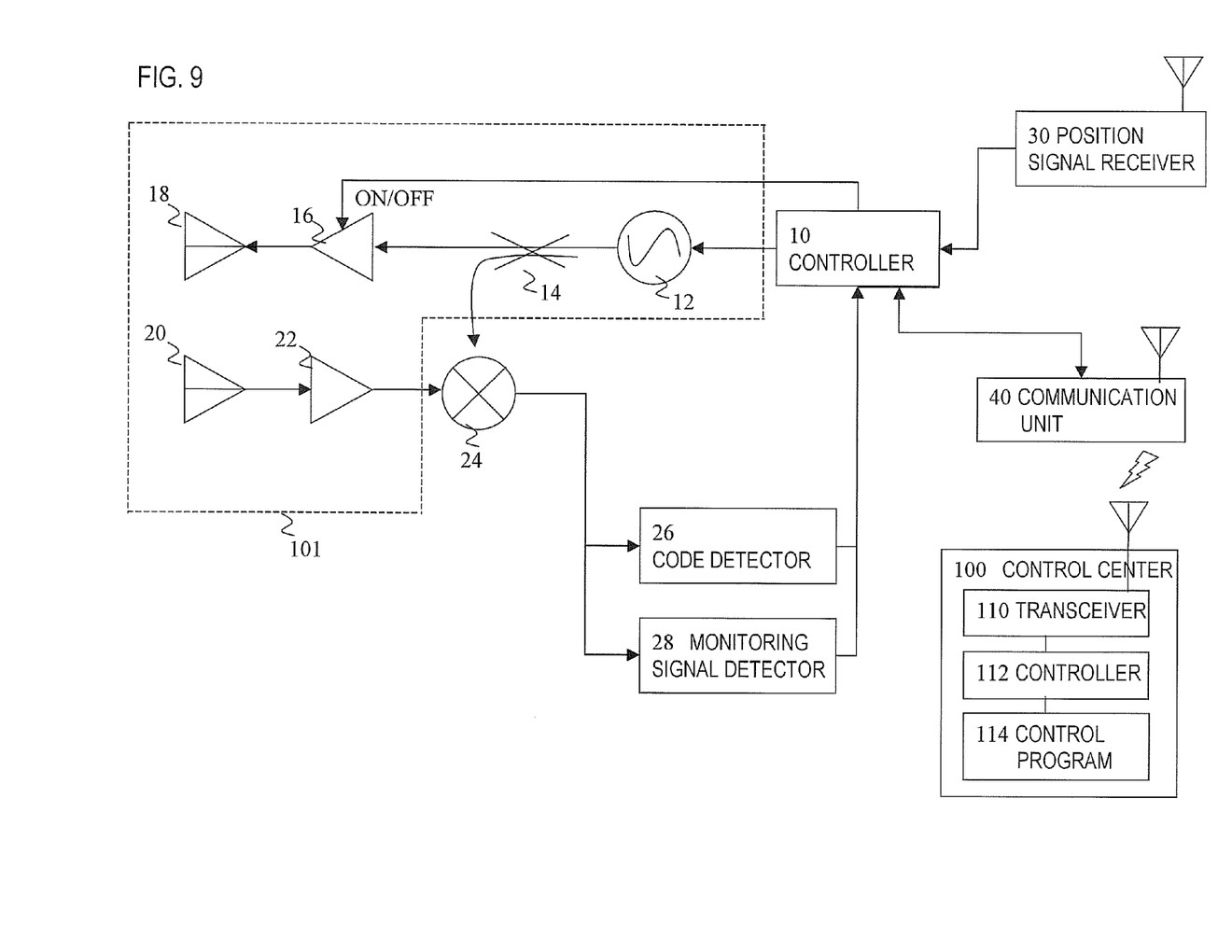
FIG. 9 is a configuration drawing of an on-vehicle control system configured of an on-vehicle radar device and a control center.

FIG. 9 is a configuration diagram of an on-vehicle radar control system configured of an on-vehicle radar device and a control center. In the on-vehicle radar device shown in FIG. 1, a position signal receiver 30 that receives a GPS signal is provided as a position-information acquiring unit for acquiring the position of the device itself, and a communication unit 40 that transmits information on the vehicle itself to and receives instructions from a control center 100 is also provided making it possible to communicate with the control center 100. At the controller 10, control is performed to transmit and receive a monitoring signal within a specified frequency band. The information transmitted to the control center is position information for the device itself, calculated based on the GPS signal, and the priority order of the device itself.

The control center 100 is comprised of a transceiver 110 that performs signal transmission to and reception from the on-vehicle radar device and a controller 112 for controlling the operation of the transceiver 110 following a control program 114. The control center 100 receives position information and priority order from a plurality of on-vehicle radar devices, and in the case that a plurality of on-vehicle radar devices exists within a distance range for which interference could be predicted, provides instructions allocating frequency bands according to the priority order of the respective devices.

For example, the control center 100 detects the existence of two on-vehicle radar devices within a radius of 500 m. When this happens, the control center 100 instructs that the on-vehicle radar device with the lower priority order shall use the frequency band 76.2 to 76.4 GHz and the on-vehicle radar device with the higher priority order shall use the frequency band 76.4 to 76.6 GHz. In this way, with each device transmitting a monitoring signal within the frequency band allocated for it, interference can be avoided even in the case that the devices are near each other.

Further, with the above-described on-vehicle radar device control system, it is also possible if each radar device is provided with means for acquiring the absolute time which receives the absolute time from a radio wave clock tower or GPS satellite, and the control center 100 indicates, in addition to the frequency band, the start time of the transmission period. In this way, interference can be avoided by having each radar device follow the instructions of the control center 100 and transmit signals in the time periods when the other radar devices are not transmitting signals.

Figure 10:
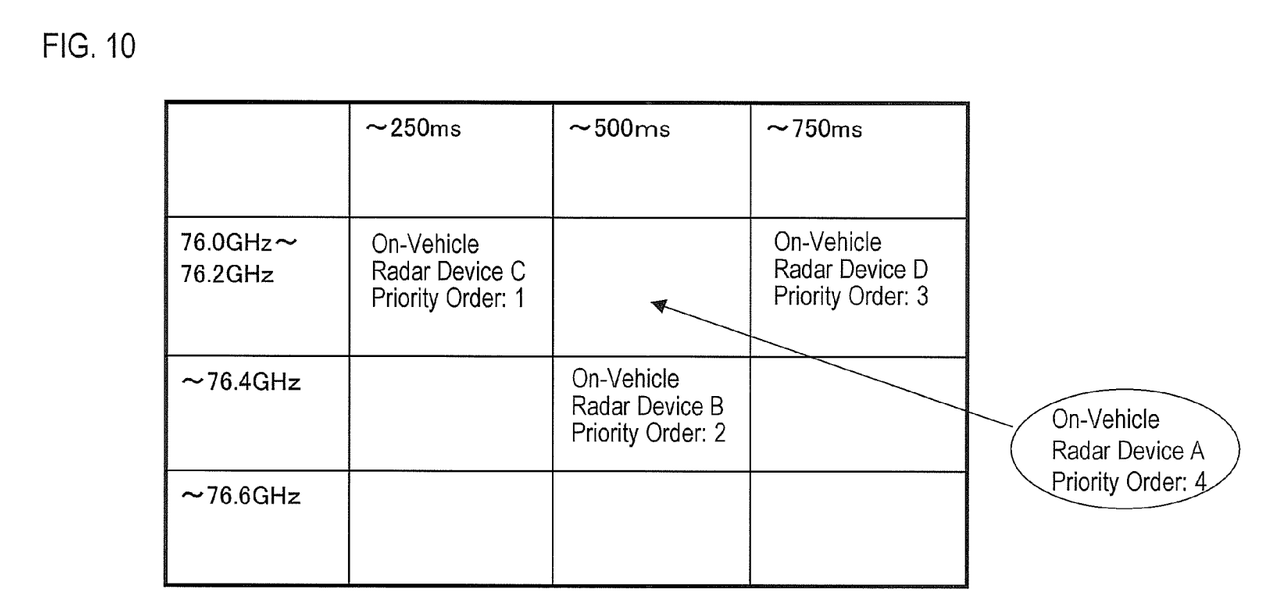
FIG. 10 is a figure that describes the frequency band and transmission period matrix provided in the control center 100.

In having the control center 100 instruct a plurality of on-vehicle radar devices as to the frequency band and transmission period for transmitted signals, it is possible to use a frequency band and transmission period matrix of the type shown in FIG. 10

FIG. 10 is a figure that describes the frequency band and transmission period matrix provided in the control center 100. At the control center 100, a matrix of the type shown in the figure is stored in a memory device inside the controller 112, and the allocation of frequency bands and transmission periods using this matrix is done as follows.

First, suppose that nearby on-vehicle radar device A, the existence of on-vehicle radar devices B, C, and D has been detected and they have priority order higher than that of on-vehicle radar device A. Further suppose that the kinds of frequency bands and signal periods shown in the figure have already been allocated to the on-vehicle radar devices. For example, to on-vehicle radar device C, allocation has been made such that the monitoring signal is to be transmitted at a frequency band of 76.0 to 76.2 GHz and during the period of 0 ms to 250 ms during each second. Likewise, to on-vehicle radar device B, allocation has been made such that the monitoring signal is to be transmitted at a frequency band of 76.2 to 76.4 GHz and during the period of 250 ms to 500 ms during each second, and to on-vehicle radar device D, such that the monitoring signal is to be transmitted at a frequency band of 76.0 to 76.2 GHz and during the period of 500 ms to 750 ms during each second.

Then, allocation is made to on-vehicle radar device A whose priority order is lower than any of the on-vehicle radar devices B through D, so that its monitoring signal is transmitted at a frequency band of 76.0 to 76.2 GHz and during the period of 250 ms to 500 ms during each second. If this is done, interference with all the on-vehicle radar devices can be avoided because, even though on-vehicle radar device A has a frequency band the same as on-vehicle radar devices C and D, its transmission period is different, and even though A has a transmission period the same as on-vehicle radar device B, the frequency bands are different.

As described above, the control center transmits instructions to each on-vehicle radar device, allocating to that device a frequency band and a transmission period, and each device transmits a signal at the allocated frequency band and in the allocated transmission period. In this way, by having each on-vehicle radar device follow these instructions, interference with other devices can be avoided.

In the above manner, the on-vehicle radar device according to the present embodiment performs transmission control so that monitoring signals are transmitted at frequency bands and in transmission periods according to the priority order of the device itself and following pre-determined rules. In this way, transmission operations can be performed that result in orderly interference avoidance between a device and other devices performing the same operation.

What is claimed is:

1. An on-vehicle radar device comprising:
a transceiver which transmits/receives monitoring signals in a specified frequency band and transmits a priority order signal, which indicates priority order corresponding to order among on-vehicle radar devices at a frequency within the specified frequency band; and
a controller which alternately switches the monitoring signals and the priority order signal transmitted by the transceiver, wherein
the transceiver receives a priority order signal of another on-vehicle radar device, and
the controller, in the case when interference with the signal of the other on-vehicle radar device is detected, following a preset rule shared by the other on-vehicle radar device, shifts the frequency band of the monitoring signal transmitted by the transceiver to a direction corresponding to the priority order of the on-vehicle radar device itself in relation to the priority order of the other on-vehicle radar device by a frequency width which is less than a width of the specified frequency band, and repeats shifting of the frequency band of the monitoring signal until the interference with the signal of the other on-vehicle device is not detected.

2. An on-vehicle radar device comprising:
a transceiver which transmits/receives monitoring signals in a specified frequency band and transmits a priority order signal at a frequency within the frequency band; and
a controller which alternately switches the monitoring signals and the priority order signal transmitted by the transceiver, wherein
the transceiver receives a priority order signal of another on-vehicle radar device, and
the controller modulates, by the specified frequency band, the frequency of the monitoring signal to be transmitted and alternately sets the frequency of the priority order signal to be transmitted at the center frequency of the modulation frequency, at the maximum frequency thereof, or at the minimum frequency thereof; and
the controller, in the case when interference with the signal of the other on-vehicle radar device is detected, based on the priority order of the other device and the priority order of the device itself, shifts, by a specified frequency, the frequency band of the monitoring signal transmitted by the transceiver, and
the shift width of the frequency band of the monitoring signal is determined based on the frequency of the priority order signal received from the other on-vehicle radar device.

3. An on-vehicle radar device having a plurality of monitoring-signal transceivers, wherein
the transceivers are arranged to point in each different direction from the vehicle, and
each of the transceivers transmits/receives a monitoring signal at a different frequency band, and transmits the monitoring signals alternately in sequence in sync with common timing to other on-vehicle radar devices having the transceivers.

4. An on-vehicle radar device comprising:
a transceiver which transmits a monitoring signal in a specified frequency band;
a controller which repeats alternately a transmission period of a specified length during which the monitoring signal is transmitted by the transceiver and a pause period of a specified length during which no monitoring signal is transmitted by the transceiver;
a position-information acquiring unit which acquires a position of the device itself; and
a communication unit which communicates with a control center, wherein
the communication unit transmits to the control center position information of the device itself and a priority order thereof, and
the control center, based on the position information received from the on-vehicle radar device, obtains a distance between the on-vehicle radar device and other on-vehicle radar device, and in the case that other on-vehicle radar device exists within a range of a specified distance, based on the priority orders of the devices, transmits an instruction to shift the transmission period or the monitoring-signal frequency band, and
the controller changes transmission period or the monitoring-signal frequency band following the instruction received from the control center.

5. An on-vehicle radar device control system comprising:
a plurality of on-vehicle radar devices; and
a control center, wherein
each of the on-vehicle radar devices comprises:
- a transceiver which transmits a monitoring signal in a specified frequency band;
- a controller which repeats alternately a transmission period of a specified length during which the monitoring signal is transmitted by the transceiver and a pause period of a specified length during which no monitoring signal is transmitted by the transceiver;
- a position-information acquiring unit which acquires a position of the device itself; and
- a communication unit which communicates with a control center, and wherein the control center, based on the position information received from the on-vehicle radar devices, obtains a distance between on-vehicle radar devices, and in the case when a plurality of on-vehicle radar devices exist within a range of a specified distance, based on the priority order of the on-vehicle radar devices, transmits an instruction to shift the transmission period or the monitoring-signal frequency band, and the controller, following an instruction received from the control center, shifts the transmission period or the monitoring-signal frequency band.

* * * * *